(12) United States Patent
Enguent et al.

(10) Patent No.: US 6,424,682 B1
(45) Date of Patent: Jul. 23, 2002

(54) BPSK ENCODER CIRCUIT

(75) Inventors: Jean-Pierre Enguent, Saint-Savournin; Thierry Legou, Saint Aubin Surtier, both of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/304,731

(22) Filed: May 4, 1999

(30) Foreign Application Priority Data

May 6, 1998 (FR) .............................................. 98 05985

(51) Int. Cl.[7] .............................................. H04L 27/20
(52) U.S. Cl. ...................... 375/308; 375/279; 375/355; 332/104
(58) Field of Search .................... 375/279, 280, 375/282, 295, 308, 354, 355, 347; 332/103, 104; 327/141, 144, 145; 340/10.34, 10.4, 10.41, 10.42; 370/503, 516, 517, 518, 522

(56) References Cited

U.S. PATENT DOCUMENTS

| | | | |
|---|---|---|---|
| 4,417,219 A | 11/1983 | Brossard et al. | ............. 332/9 R |
| 4,809,296 A | * 2/1989 | Braun et al. | ................. 375/347 |
| 5,153,583 A | 10/1992 | Murdoch | ............... 340/825.54 |

FOREIGN PATENT DOCUMENTS

| | | |
|---|---|---|
| EP | 0 719 014 A2 | 6/1996 |
| EP | 0 706 151 A3 | 12/1996 |
| EP | 0 853 291 A1 | 7/1998 |

OTHER PUBLICATIONS

Patent Abstracts of Japan, vol. 098, No. 005, Apr. 30, 1998, and JP 10 013312 A (Sony Corp), Jan. 16, 1998.

* cited by examiner

*Primary Examiner*—Jean Corrielus
(74) *Attorney, Agent, or Firm*—Lisa K. Jorgenson; Allen, Dyer, Doppelt, Milbrath & Gilchrist, P.A.

(57) ABSTRACT

A BPSK encoder is provided with a first circuit which processes a carrier signal and a binary signal to be encoded, and produces an output binary signal having synchronous phase shifts representing a change in the value of the signal to be encoded. Also, the first circuit is provided with a sampling signal from a second circuit. The second circuit includes a delay circuit to deliver a shifted carrier signal that is smaller than the half-period of the carrier signal, and a logic gate for the logic combination of the carrier signal and the shifted carrier signal. The logic gate also delivers a binary sampling signal having at least two leading or trailing edges at each period of the carrier signal.

32 Claims, 3 Drawing Sheets

BPSK ENCODER CIRCUIT

FIELD OF THE INVENTION

The present invention relates to the field of data encoding, and, in particular, to a BPSK (binary phase shift keying) encoding circuit.

BACKGROUND OF THE INVENTION

The transfer of binary data by carrier phase shifts, commonly known as binary phase shift keying (BPSK), is a well-known technique and an alternative to amplitude modulation or frequency modulation data transfer techniques. Furthermore, it is common for these various techniques to be combined, for example, a sub-carrier modulated by phase-shift keying used as a signal for the amplitude modulation or the frequency modulation of a main carrier.

Conventionally, as shown in FIG. 1, a BPSK encoder 1 comprises an encoding circuit 2 for receiving an input signal Sin to be encoded. The encoding circuit 2 also receives a carrier signal C1 as well as a sampling signal C2 having a frequency at least equal to twice the frequency of the carrier C1. A circuit 3 for receiving the carrier C1 delivers the sampling signal C2 to the encoding circuit 2. The encoding circuit 2 delivers an output signal Sout encoded by phase shifts.

Specifically, exemplary signals C1, Sin and Sout are shown in FIGS. 2A, 2B, 2C. The output signal Sout resembles that of the carrier C1 but has phase shifts 4, 5 after each change in the logic value of the input signal Sin to be encoded. Phase shifts of this kind are synchronized and expressed by the fact that, during a half period, the signal Sout preserves the logic value that is presented during the preceding half-period, instead of changing its value.

Although this encoding technique is advantageous, especially because of a high signal-to-noise ratio and great ease of decoding, the standard BPSK encoders are complex to make. In particular, the circuit 3 delivering the sampling signal C2 is conventionally comprised of a phase locked loop (PLL) with a certain complexity that is more difficult to implement than a purely logic circuit.

BRIEF SUMMARY OF THE INVENTION

Thus, it is an object of the present invention to provide a BPSK encoder that is efficient and simple to make at a low cost. Another object of the present invention is to provide for a BPSK encoder made exclusively out of standard logic gates that can be easily integrated into a silicon integrated circuit.

These objects are achieved by providing a BPSK encoder comprising a first circuit which processes a carrier signal and a binary signal to be encoded, and produces an output binary signal having synchronous phase shifts representing a change in the value of the signal to be encoded. Also, the first circuit is provided with a sampling signal from a second circuit. The second circuit comprises a delay circuit to deliver a shifted carrier signal that is smaller than the half-period of the carrier signal, and a logic gate for the logic combination of the carrier signal and the shifted carrier signal. The logic gate also delivers a binary sampling signal comprising at least two leading or trailing edges at each period of the carrier signal.

According to one embodiment, the first circuit can sample the signal to be encoded at the rate of the leading edges or at the rate of the trailing edges of the shifted carrier signal, and deliver a synchronized signal to be encoded. Additionally, the first circuit can deliver a composite signal equal to the shifted carrier signal or to the inverted shifted carrier signal depending on the logic value of the synchronized signal to be encoded. The first circuit can sample the composite carrier signal at the rate of the leading edges or at the rate of the trailing edges of the sampling signal, and deliver the output binary signal. The delay circuit may comprise at least two series-connected inverter gates.

Furthermore, the logic gate for producing the sampling signal may comprise an XOR gate which receives, at a first input, the carrier signal and, at a second input, the inverted shifted carrier signal. Also, the synchronized signal to be encoded may be delivered by a D type flip-flop circuit which receives the carrier signal at its clock input and the signal to be encoded at its D type input.

Additionally, the composite signal may be delivered by an XOR gate which receives, at a first input, the shifted carrier signal and, at a second input, the synchronized signal to be encoded. Moreover, the composite carrier signal may be sampled by a D type flip-flop circuit which receives the sampling signal at its clock input and the composite carrier signal at its D type input.

The present invention also relates to an integrated circuit with contactless operation, comprising an antenna coil and a switch to modulate the load of the antenna coil. The switch is driven by the output of an encoder according to the invention and as set forth above. The present invention also relates to a portable electronic device comprising such an integrated circuit.

BRIEF DESCRIPTION OF THE DRAWINGS

These features and advantages of the present invention shall be explained in greater detail in the following description, given by way of a non-restrictive example, of an embodiment of an encoder according to the invention with reference to the appended figures, of which.

DETAILED DESCRIPTION OF THE PREFERRED EMBODIMENTS

Figure 1:
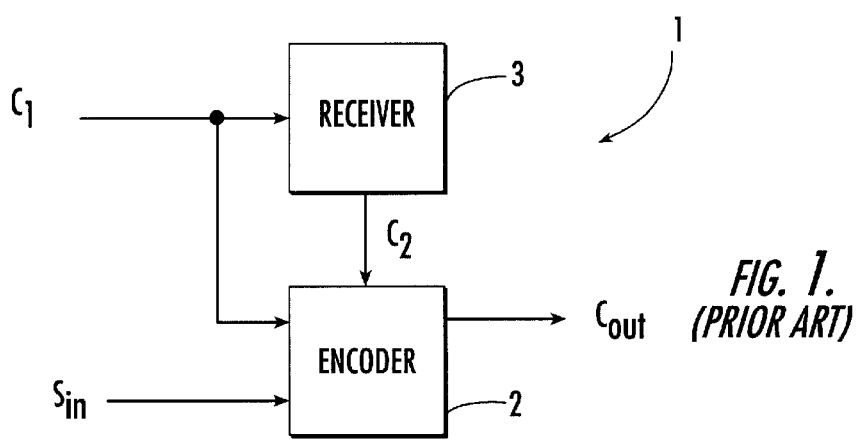
FIG. 1 is a block diagram of a prior art BPSK encoder.
Figure 2A:
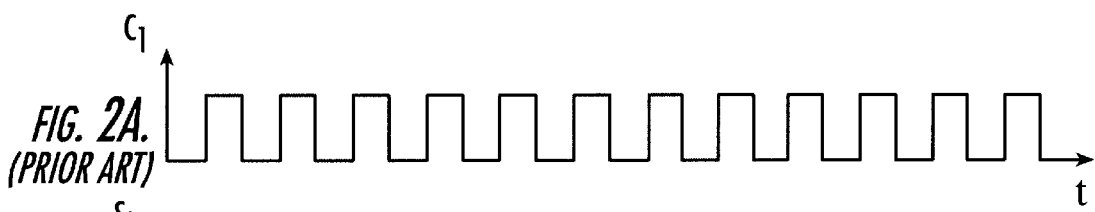
FIGS. 2A to 2C represent electrical signals illustrating the operation of the prior art encoder of FIG. 1.
Figure 2B:
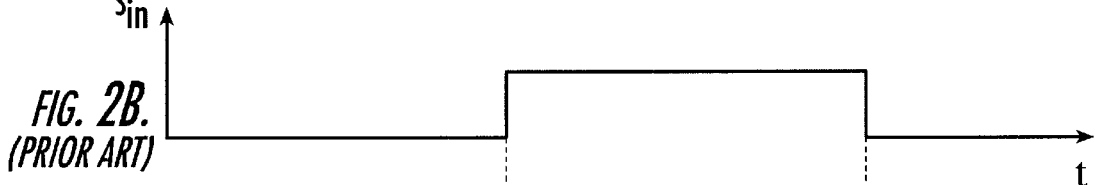
Figure 2C:
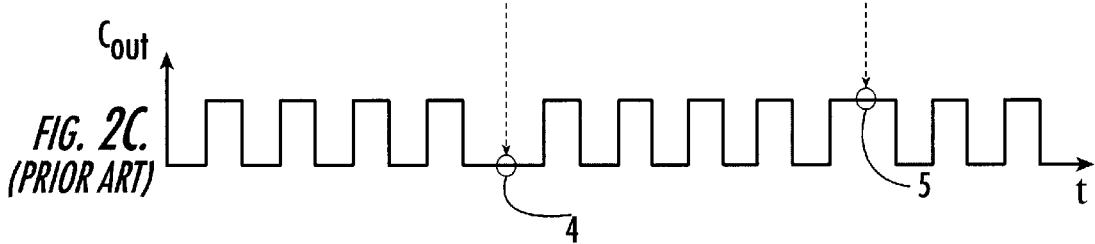
Figure 3:
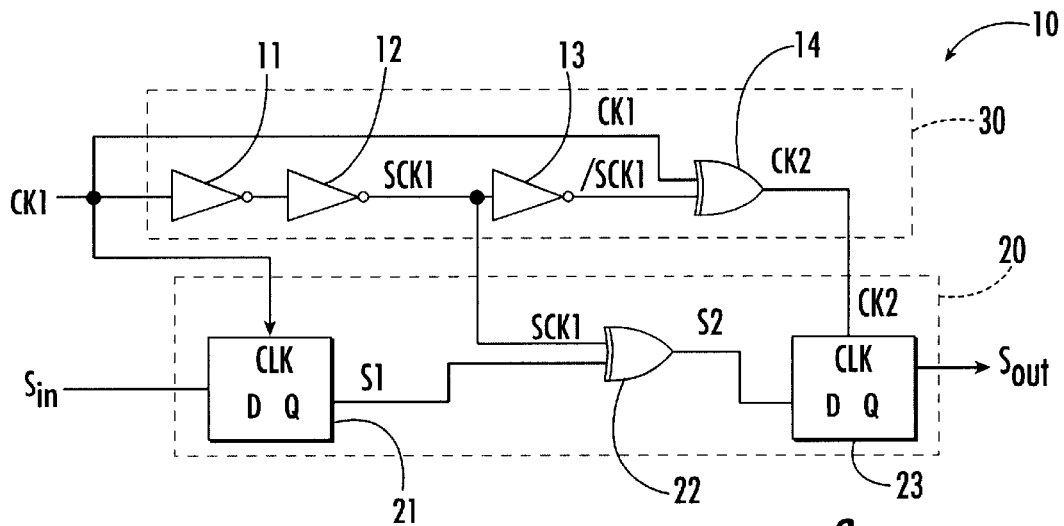
FIG. 3 is a logic diagram of a BPSK encoder according to the invention.

FIG. 3 shows a BPSK encoder 10 according to the invention, having a particularly simple structure including logic gates and standard flip-flop circuits. The circuit 10 comprises an encoder sub-assembly 20 comprising a first D type flip-flop circuit 21, an XOR gate 22 and a second D type flip-flop circuit 23. The flip-flop circuits 21 and 23 are of a synchronous type and are chosen here for activation on a leading edge of the clock inputs CLK. At its D input, the flip-flop circuit 21 receives a binary signal Sin to be encoded. At its clock input CLK, this flip-flop circuit 21 receives a binary signal CK1 used as a carrier. The Q output of the flip-flop circuit 21 is applied to an input of the gate 22 whose output is applied to the D input of the flip-flop circuit 23. The Q output of the flip-flop circuit 23 delivers the output signal Sout of the encoder circuit 10.

Associated with the encoder sub-assembly 20, is a sub-assembly 30 comprising three AND gates 11, 12, 13 and an XOR gate 14. The gates 11 to 13 are cascade-connected. The output of the gate 12 is also applied to the second input of the gate 22 of the sub-assembly 20. At its first input, the gate 14 receives the carrier CK1. Its second input is connected to the output of the gate 13. Finally, the output of the gate 14 is applied to the clock input CLK of the flip-flop circuit 23 of the sub-assembly 20.

The transistors forming the gates 11 and 12, for example MOS transistors, are sized so that the gates 11, 12 form a delay line offering a switch-over delay Dt substantially smaller than the half-period of the carrier CK1 (or a delay that is a multiple of the period of the carrier providing a shift modulo 2p equal to Dt). Thus, at the output of the gate 12, there is a signal SCK1 shifted by the delay Dt with respect to the carrier CK1. More particularly, the signals CK1 and SCK1 are shown in FIGS. 4B and 4C.

Figure 4:
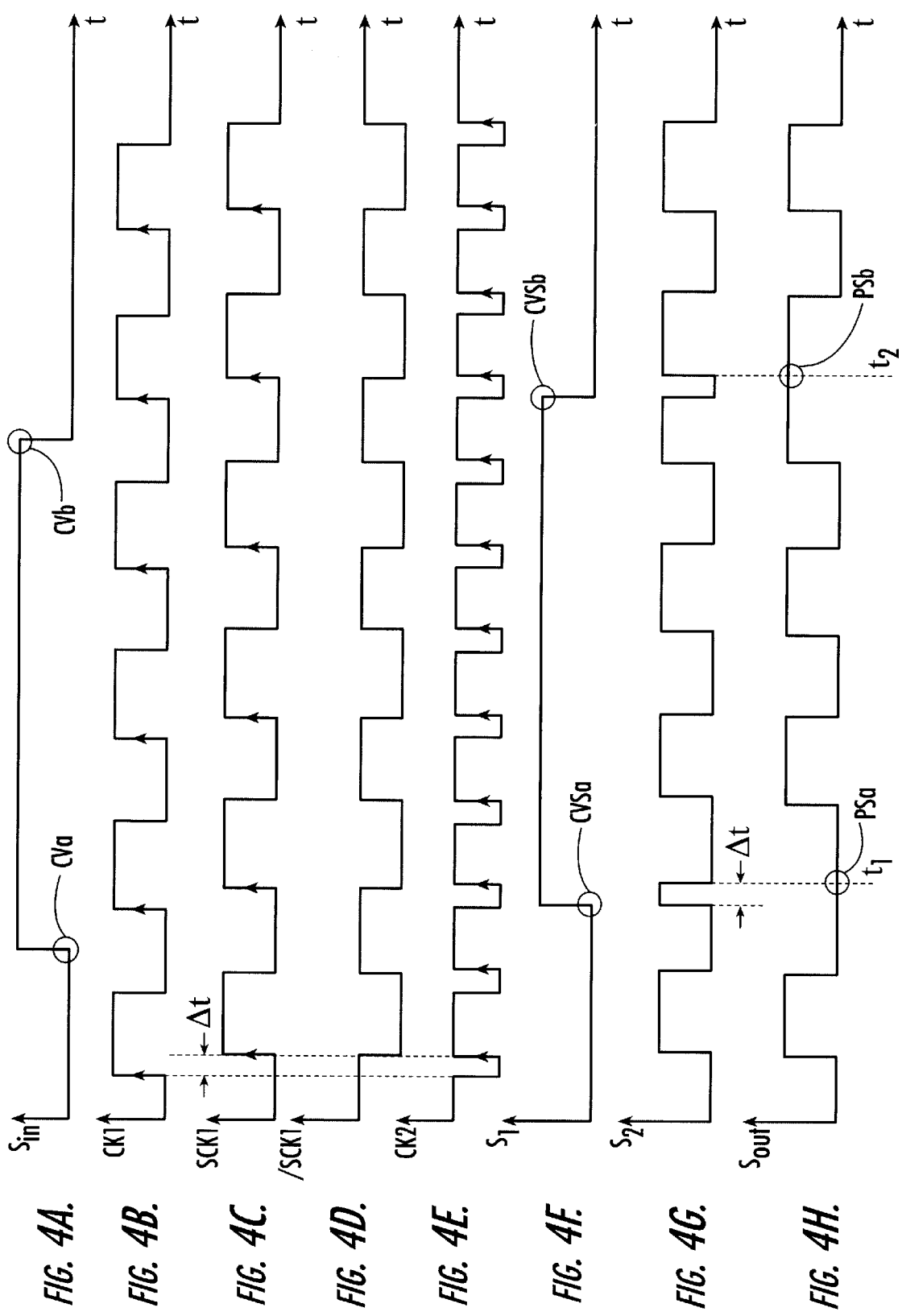
FIGS. 4A to 4H show various electrical signals illustrating the operation of the encoder according to the invention.

At the output of the third gate 13, there is an inverted shifted signal /SCK1 shown in FIG. 4D. Thus, the gate 14 delivers a sampling signal CK2, shown in FIG. 4E, which goes to 0 when the two signals CK1 and /SCK1 are simultaneously at the value 1, namely for the duration Dt. The signal CK2 thus shows an oscillation frequency equal to twice the frequency of the carrier CK1 and, at each period of the carrier CK1, provides two leading edges synchronized with the leading and trailing edges of the shifted signal-SCK1.

In the sub-assembly 20, the flip-flop circuit 21 samples the input signal Sin at the rate of the carrier CK1 and delivers a synchronized signal Si. FIG. 4A shows an exemplary signal Sin and FIG. 4F shows the corresponding synchronized signal Si. It can be seen that the variations CVa (passage to 1) and CVb (passage to 0) of the logic value of the signal Sin can be found again in the signal S1 in the form of variations CVSa, CVSb synchronized with the leading edges of the carrier CK1.

Thus, the XOR gate 22 delivers a composite signal S2, shown in FIG. 4G, whose value depends on the signal S1. More specifically, the signal S2 is equal to the shifted signal SCK1 when the signal Sin is at 0, or to the inverted shifted signal/SCK1 when the signal Sin is at 1. It can thus be seen in FIG. 4G that the variation CVSa of the signal S1 prompts, in a transient manner (namely during the period Dt), the passage to 1 of the signal S2 and its passage to 0 at an instant t1. It can be seen that the signal S2 would go to 1 at this instant t1 if the signal S1 were to remain constant. This instant t1 corresponds to the time when the flip-flop circuit 23, driven by the signal CK2, samples the signal S2. Thus, the consequence of the passage to 0 of the signal S2 at the instant t1 is that the output signal Sout, shown in FIG. 4H, remains at 0 for an additional half-period instead of changing its value. Thus the instant t1 corresponds to a first phase shift PSa of the output signal Sout.

Similarly, the variation CVSb of the signal S1 prompts, in a transient manner, the passage to 0 of the signal S2 and its passage to 1 at an instant t2 where the signal S2 would go to 0 if the signal S1 had remained constant. Thus, at the instant t2, the output signal Sout remains at 1 for an additional half-period and shows a second phase shift PSb.

In sum, the present invention enables the delivery of a BPSK encoded signal from an input signal Sin which does not need to be synchronized with the carrier CK1 beforehand. It is quite clear however that the flip-flop circuit 21 would not be necessary if the signal Sin was input in a state synchronized with the carrier signal CK1.

It will be seen by those skilled in the art that the present invention is capable of having several alternative embodiments. For example, the XOR gate 22 may be replaced by a multiplexer circuit selecting, at its output, as a function of the value of the signal S1, the shifted signal SCK1 delivered by the gate 12 of the inverted shifted signal/SCK1 delivered by the gate 13. Furthermore, those skilled in the art would be capable of modifying the flip-flop circuits 21, 23 that are activated on the trailing edge.

The BPSK encoder that has just been described, comprised of standard logic gates and flip-flop circuits, is well suited to integration in a silicon chip. One application that can be especially envisaged is the transmission of data by inductive coupling and load modulation between an integrated circuit with contactless operation and a terminal.

Figure 5:
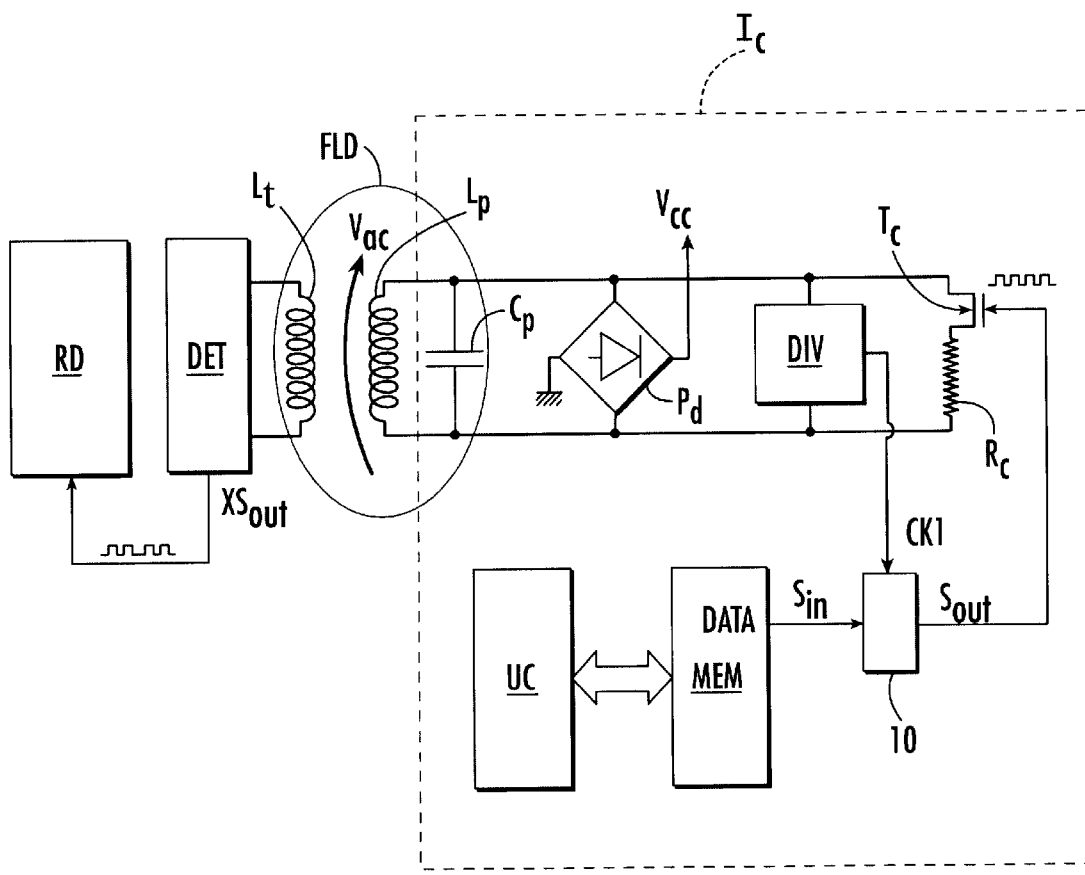
FIG. 5 is a schematic illustration of an application of the encoder according to the invention, to an inductive coupling data transmission circuit.

FIG. 5 shows an application of this kind. This figure shows a integrated circuit IC working by electromagnetic induction. The integrated circuit IC is, for example, set in a chip card or any other portable electronic device, such as an electronic label, electronic key-holders, etc. The integrated circuit IC has an antenna coil Lp forming, with a capacitor Cp, an inductive resonant circuit. This resonant circuit LpCp is excited by an alternating magnetic field FLD sent out by the coil Lt of a station RD, for example, a contactless chip card reader.

The integrated circuit IC comprises a rectifier bridge Pd to rectify a voltage Vac induced at the terminals of the coil Lp and to deliver a supply voltage Vcc. The integrated circuit IC also has a central processing unit UC, for example a microprocessor, a memory MEM, a divider circuit DIV to divide the oscillation frequency of the voltage Vac, an encoder 10 according to the invention, and, in parallel with the coil Lp, a transistor Tc series-connected with a resistor Rc.

Data to be transmitted to the station RD is delivered by a serial output DATA of the memory MEM and sent to the encoder 10. The encoder 10 receives, as a carrier signal CK1, a signal delivered by the divider DIV. The frequency of the signal CK1 is thus a sub-multiple of the carrier frequency of the magnetic field FLD. The signal Sout, encoded by phase shifts, is applied to the transistor Tc which closes and opens alternately at the rate of the signal Sout. Each closure of the transistor Tc modifies the impedance of the coil Lp and prompts a modulation of load on the coil Lt of the station RD. The station RD is outfitted with a circuit DET for the detection of load modulations, for example, a current voltage or phase detector which delivers a signal XSout in accordance with the signal Sout. The signal XSout is given to the station RD for demodulation. This enables the station to retrieve the data Sin sent by the integrated circuit IC.

Thus, in this exemplary application, the carrier CK1 (which becomes the signal Sout after encoding) is a load modulation sub-carrier extracted from the carrier of the magnetic field FLD.

That which is claimed is:

1. An encoder for receiving a carrier signal and an input signal, and generating an output signal therefrom, the encoder comprising:
   a first circuit for generating the output signal having synchronous phase shifts which represent changes in a value of the input signal; and
   a second circuit for providing the first circuit with a sampling signal, the second circuit comprising
   delaying means for providing a shifted carrier signal having a shift with respect to the carrier signal that is less than a half-period of the carrier signal, and combining means for combining the carrier signal and the shifted carrier signal and for delivering the sampling signal having at least two leading or trailing edges at each period of the carrier signal.

2. An encoder according to claim 1, wherein the first circuit comprises first sampling means for sampling the input signal at a rate of leading or trailing edges of the carrier signal, and for providing a synchronized signal to be encoded.

3. An encoder according to claim 2 wherein the second circuit further comprises an inverter for receive the shifted carrier signal and providing an inverted shifted carrier signal to the combining means; and wherein the first circuit further comprises:
   a logic gate for providing a composite carrier signal equal to the shifted carrier signal or to the inverted shifted carrier signal depending on a logic value of the synchronized signal; and
   second sampling means for sampling the composite carrier signal at a rate of the leading or trailing edges of the sampling signal, and for generating the output signal.

4. An encoder according to claim 3, wherein the logic gate comprises an XOR gate for receiving the shifted carrier signal and the synchronized signal.

5. An encoder according to claim 3, wherein the second sampling means comprises a D type flip-flop circuit for receiving the sampling signal at a clock input and the composite carrier signal at a D input.

6. An encoder according to claim 2, wherein the first sampling means comprises a D type flip-flop circuit for receiving the carrier signal at a clock input and the input signal at a D input.

7. An encoder according to claim 1, wherein the delaying means comprises at least two series-connected inverter gates.

8. An encoder according to claim 1, wherein the combining means comprises an XOR gate.

9. An encoder according to claim 1, wherein the input signal is a binary input signal and the output signal is a binary output signal so that the encoder is a BPSK encoder.

10. A BPSK encoder for receiving a carrier signal and an binary input signal and generating a binary output signal therefrom, the encoder comprising:
    a first circuit for generating the binary output signal having synchronous phase shifts which represent changes in a value of the binary input signal; and
    a second circuit for providing the first circuit with a sampling signal, the second circuit comprising
       at least one delay element for providing a shifted carrier signal, and
       at least one logic gate for receiving the carrier signal and the shifted carrier signal and for delivering the sampling signal to the first circuit.

11. A BPSK encoder according to claim 10, wherein the shifted carrier signal has a shift that is less than a half-period of the carrier signal.

12. A BPSK encoder according to claim 10, wherein the sampling signal has at least two leading or trailing edges at each period of the carrier signal.

13. A BPSK encoder according to claim 10, wherein the at least one logic gate of the second circuit comprises an XOR gate.

14. A BPSK encoder according to claim 10, wherein the at least one delay element of the second circuit comprises at least two series connected inverters.

15. A BPSK encoder according to claim 10, wherein the first circuit comprises a D type flip-flop circuit for sampling the binary input signal at a rate of leading or trailing edges of the carrier signal, and for providing a synchronized signal to be encoded, the D type flip-flop circuit receiving the carrier signal at a clock input and the input signal at a D input.

16. A BPSK encoder according to claim 15, wherein the second circuit further comprises an inverter for receiving the shifted carrier signal and providing an inverted shifted carrier signal to the at least one logic gate; and wherein the first circuit further comprises:
    an XOR gate for receiving the shifted carrier signal and the synchronized signal and for providing a composite carrier signal equal to the shifted carrier signal or to the inverted shifted carrier signal depending on a logic value of the synchronized signal; and
    a second D type flip-flop circuit for sampling the composite carrier signal at the rate of the leading or trailing edges of the sampling signal, and for delivering the binary output signal, the second D type flip-flop circuit receiving the sampling signal at a clock input and the composite carrier signal at a D input.

17. An electronic device comprising:
    an antenna;
    a switch to modulate a load on the antenna; and
    an encoder connected to the switch for receiving a binary input signal and a carrier signal, the encoder comprising a first circuit for outputting a binary output signal having synchronous phase shifts which represent a change in a value of the binary input signal, and a second circuit for providing the first circuit with a sampling signal, the second circuit comprising
       at least one delay element for providing a shifted carrier signal, and
       at least one logic gate for receiving the carrier signal and the shifted carrier signal and for delivering the sampling signal to the first circuit.

18. An electronic device according to claim 17, further comprising a capacitor connected to the antenna thereby forming an inductive resonant circuit.

19. An electronic device according to claim 17, further comprising a rectifier bridge for rectifying a voltage induced at the antenna.

20. An electronic device according to claim 19, further comprising a divider for dividing an oscillation frequency of the voltage and for providing the carrier signal to the encoder.

21. An electronic device according to claim 17, further comprising a data memory for providing the binary input signal to the encoder.

22. An electronic device according to claim 17, wherein the shifted carrier signal has a shift that is less than a half-period of the carrier signal.

23. An electronic device according to claim 17, wherein the sampling signal has at least two leading or trailing edges at each period of the carrier signal.

24. An electronic device according to claim 17, wherein the at least one logic gate of the second circuit is an XOR gate.

25. An electronic device according to claim 17, wherein the at least one delay element of the second circuit comprises at least two series connected inverters.

26. An electronic device according to claim 17, wherein the first circuit comprises a D type flip-flop circuit for sampling the binary input signal at a rate of leading or trailing edges of the shifted carrier signal, and for providing a synchronized signal to be encoded, the D type flip-flop circuit receiving the carrier signal at a clock input and the input signal at a D input.

27. An electronic device according to claim 26, wherein the second circuit further comprises an inverter for receiving the shifted carrier signal and providing an inverted shifted carrier signal to the at least one logic gate; and wherein the first circuit further comprises:

an XOR gate for receiving the shifted carrier signal and the synchronized signal and for providing a composite carrier signal equal to the shifted carrier signal or to the inverted shifted carrier signal depending on a logic value of the synchronized signal; and a second D type flip-flop circuit for sampling the composite carrier signal at the rate of the leading or trailing edges of the sampling signal, and for delivering-the binary output signal, the second D type flip-flop circuit receiving the sampling signal at a clock input and the composite carrier signal at a D input.

28. An electronic device according to claim 17, further comprising a substrate for carrying the antenna, the switch and the encoder.

29. A method of encoding a binary input signal, the method comprising the steps of:

generating a shifted carrier signal from a carrier signal;

combining the carrier signal and the shifted carrier signal to produce a sampling signal having at least two leading or trailing edges at each period of the carrier signal; and generating a binary output signal having synchronous phase shifts which represent a change in a value of the binary input signal and is based upon the sampling signal.

30. A method according to claim 29, wherein the shifted carrier signal has a shift, with respect to the carrier signal, that is less than a half-period of the carrier signal.

31. A method according to claim 29, further comprising the steps of:

sampling the binary input signal at a rate of leading or trailing edges of the shifted carrier signal; and providing a synchronized signal to be encoded.

32. A method according to claim 41, further comprising the steps of:

providing a composite carrier signal equal to the shifted carrier signal or to an inverted shifted carrier signal depending on a logic value of the synchronized signal; and sampling the composite carrier signal at the rate of the leading or trailing edges of the sampling signal

* * * * *

UNITED STATES PATENT AND TRADEMARK OFFICE
CERTIFICATE OF CORRECTION

PATENT NO.     : 6,424,682 B1                                        Page 1 of 1
DATED          : July 23, 2002
INVENTOR(S)    : Jean-Pierre Enguent and Thierry Legou It is certified that error appears in the above-identified patent and that said Letters Patent is hereby corrected as shown below:

Column 3,
Lines 31 and 33, delete "Si" insert -- S1 --

Column 8,
Line 18, delete "41" insert -- 31 --
Line 25, delete "signal" insert -- signal. --

Signed and Sealed this

Tenth Day of December, 2002

JAMES E. ROGAN
*Director of the United States Patent and Trademark Office*